US006299771B1

(12) United States Patent
Shmidt et al.

(10) Patent No.: US 6,299,771 B1
(45) Date of Patent: Oct. 9, 2001

(54) COMPOSITE ADSORBENT ELEMENT

(75) Inventors: Joseph L. Shmidt, Brooklyn, NY (US); Alexander V. Pimenov; Alexander I. Lieberman, both of St. Petersburg (RU)

(73) Assignee: Electrophor, Inc., Dobbs Ferry, NY (US)

( * ) Notice: Subject to any disclaimer, the term of this patent is extended or adjusted under 35 U.S.C. 154(b) by 0 days.

(21) Appl. No.: 09/310,476

(22) Filed: May 12, 1999

Related U.S. Application Data

(62) Division of application No. 08/791,859, filed on Jan. 31, 1997, now Pat. No. 5,904,854.

(51) Int. Cl.[7] ............................. B01D 27/02; B01D 39/00
(52) U.S. Cl. .................. 210/263; 210/502.1; 210/265; 210/505; 210/508
(58) Field of Search ............................. 210/502.1, 686, 210/251, 792, 694, 508, 505, 263, 635, 198.2, 265; 428/408

(56) References Cited

U.S. PATENT DOCUMENTS

| | | | |
|---|---|---|---|
| 4,789,479 * | 12/1988 | Onitsuka et al. ................. | 210/502.1 |
| 4,944,996 * | 7/1990 | Bauer et al. ........................ | 210/505 |
| 5,183,546 * | 2/1993 | Oren et al. ........................ | 210/502.1 |
| 5,192,604 * | 3/1993 | Giglia .................................. | 428/224 |
| 5,230,960 * | 7/1993 | Lizuka . | |
| 5,238,568 * | 8/1993 | Fely et al. ........................... | 210/490 |
| 5,308,482 * | 5/1994 | Mead . | |
| 5,521,008 * | 5/1996 | Lieberman et al. ............... | 428/367 |
| 5,736,053 * | 4/1998 | Ikyshima et al. . | |
| 5,904,854 * | 5/1999 | Shmidt et al. .................... | 210/686 |

* cited by examiner

*Primary Examiner*—Ana Fortuna
(74) *Attorney, Agent, or Firm*—Ronald S. Cornell

(57) ABSTRACT

A composite adsorbent element comprising a packed mixture of granules and fibers, which are desirably granular activated carbon (GAC) and activated carbon fiber (ACF). The element is employed as a filter for purifying tap water. In the composite adsorbent element the activated carbon fibers fill the spaces between the activated carbon granules. The size and relative amounts of the GAC and ACF are designed to enable water treatment to remove impurities from water more rapidly than conventional filters using granular activated carbon. Furthermore, when there are significant time intervals between filtration, a packed mixture of granular activated carbon and activated carbon fibers made in accordance with the invention shows an improved ability to rejuvenate its adsorption capabilities in the time intervals between filtrations.

11 Claims, No Drawings

COMPOSITE ADSORBENT ELEMENT

FIELD OF THE INVENTION

This application is a division of U.S. Ser. No. 08/791,859, filed on Jan. 31, 1997, U.S. Pat. No. 5,904,854.

The present invention relates to water purification, and, more particularly, to the use of a composite activated carbon element that exhibits reduced flow resistance and improved adsorption properties to improve the quality of potable water.

BACKGROUND OF THE INVENTION

The need to purify water as, for example, at home (point-of-use water purification systems) is increasing because of the increased incidence of man-made contaminants, the growth of population world wide, and the concomitant increasing burden on the water resources. As more medical and environmental information becomes available about the ability of contaminants in water to cause illnesses, the need to use pure water becomes increasingly evident.

Typical point-of-use water purification systems comprise a bed made of activated carbon that is used to remove chlorine and organic and other impurities. Most often the activated carbon is in granular form. Advantages of the use of an adsorption bed made of granular activated carbon are that granular activated carbon is inexpensive, granular activated carbon in the bed does not compact under flow, and granular activated carbon has relatively little resistance to the flow of water therethrough. A disadvantage of using a granular activated carbon bed is its slow adsorption rate. In industrial applications, it is recommended to have at least 15 minutes contact time between the fluid and the activated granular carbon adsorbent bed. Another disadvantage of a granular activated carbon bed is that, due to the relatively large size of the granules and the void spaces therebetween, it does not remove smaller particulate contaminants.

Powdered activated carbon is known to adsorb impurities faster than granular activated carbon, but the inclusion of carbon fines provides high flow resistance and leads to undesirable compaction under flow. Attempts to avoid compaction commonly involve the incorporation of a binder. While filtration elements comprising activated carbon particles bound into a rigid structure using a polymeric thermoplastic material will not compact under flow, a disadvantage of these so called "carbon-block" structures is that a part of the adsorption capacity of activated carbon is lost due to contact with the immobilizing binding material. Another disadvantage is that, in such filters, the activated carbon occupies only a portion of the adsorption bed volume. The rest of the adsorption bed volume is taken by the immobilizing polymeric binding material. The binder is not active in adsorbing impurities, and its incorporation leads to increased bed sizes as compared to an adsorption bed that contains only activated carbon. Yet another disadvantage of carbon-block material is that its ability to be regenerated or sterilized with steam is hindered due to the presence of the thermoplastic binding material. In addition, making carbon-block material is costly, requiring exact temperatures and other precisely controlled processing conditions.

Activated carbon fiber has been used, but it is expensive and it does compact under flow, leading to moderate flow resistance, although compaction of activated carbon fibers is considerably less than that experienced when employing powdered activated carbon.

SUMMARY OF THE INVENTION

An object of the present invention is to provide a composite filter element that exhibits reduced flow resistance and improved adsorption properties; including high adsorption activity, high adsorption capacity, and which causes less pressure drop than corresponding conventionally available filters, and which novel composite element of the invention is easy to prepare.

A further object of the invention is to provide a method for purifying water using a composite activated carbon filter formed from a combination of GAC and ACF in which the activated carbon fibers are positioned between the activated carbon granules in a manner to eliminate all of the larger voids therebetween.

A still further object is to provide adsorption materials which comprise a mixture of ACF and GAC.

Yet another object is to provide a process for producing the above described adsorption material, mixing milled activated carbon fiber and granular activated carbon in water and removing the excess water from the mixture.

The above and further objects and novel features of the invention will appear more fully from the following detailed description of the invention.

DETAILED DESCRIPTION OF THE INVENTION

The adsorption material of the present invention comprises a mixture of granules and fibers, and particularly a mixture of granular activated carbon (GAC) and activated carbon fiber (AGF). In an alternate embodiment of the invention, we employ a mixture of ion exchange resin granules mixed with ion exchange fibers.

The term "GAC" as used herein means granular activated carbon in its art recognized sense, i.e., porous carbon particles which range in size from 50 to 3000 microns. Preferably, the granules used when practicing this invention will have diameters from about 100 to 2,000 microns, and most preferably about 200 to 1,000 microns. Granules useful in accordance with this invention will also have a specific surface area of at least 300 $m^2/g$, and more preferably at least 500 $m^2/g$. They will also have an adsorption capacity of methylene blue of at least 50 mg/g, and more preferably at least 100 mg/g.

The term "ACF" as used herein means activated carbon fiber in its art recognized sense; that is, porous carbon fibers obtained from organic fibers through a carbonization treatment and an activation treatment. ACF is classified by the starting material used to prepare the same. Common starting materials include rayon, polyacrylonitrile, pitch, and the like. Any of these types of ACF is suitable for use in the present invention. Of the various, commercially available ACF materials, rayon type ACF is particularly preferred in view of its high adsorption capacity and its ability to rapidly adsorb impurities. Rayon type ACF can be prepared, for example, by the process described in U.S. Pat. No. 5,521,008, the disclosure of which is incorporated herein by reference..

Activated carbon fiber has the ability to adsorb impurities faster than powdered activated carbon. In addition, while it does compact under flow leading to moderate flow resistance, compaction of activated carbon fibers is considerably less than that experienced when employing powdered activated carbon. One of the advantages of activated carbon fiber materials is that they have smaller quantities of carbon fines than powder materials. In addition, carbon fines that are generated when ACF is used do not impede the flow nearly as much as the carbon fines generated by powdered activated carbon. Another advantage of using activated carbon fibers is that due to their small diameter, and the proximity of the fibers to each other, suspended solids and silt can readily be removed from incoming aqueous feed. Working as a depth filter, it also removes bacteria from water.

ACF that is useful for the present invention will have a specific surface area of at least about 400 m²/g, and preferably at least 750 m²/g. The individual fibers will also have an average diameter which is significantly smaller that the average diameter of the GAC which is employed. Desirably, the average diameter of the GAC is an order of magnitude larger than the average diameter of the ACF, and the maximum diameter of the ACF will be significantly less than about half of the smallest diameter of the granules, i.e., the diameter of the ACFs will be on the order of from 1 to 30 microns, and preferably of from 4 to 20 microns. They will also have an adsorption capacity of at least about 200 mg/g of methylene blue, preferably at least 350 mg/g. As the average diameter of the fibers falls below 4 microns the activated carbon fiber tends to create excessive amount of carbon fines and the packing density tends to become excessively large. Below 1 micron average diameter, the packing density becomes so large that effective filtration becomes impractical. The length distribution of ACF used for making the composite adsorption material is desirably from about 0.2 mm to 20 mm, and preferably from about 1 to 10 mm.

The packing density of commercial grade GAC is generally from about 0.4 g/cm³ to 0.6 g/cm³. The packing density of ACF is generally from about 0.04 g/cm³ to 0.3 g/cm³, and it is more likely to be about 0.1 g/cm³.

The term "mixed" as used herein with respect to the state of ACF and the GAC in the composite adsorption bed means that ACF are entangled together and around GAC particles with ACF essentially filling the gaps between GAC granules which are packed together, touching each other.

The content of ACF in the composite adsorption material is desirably about 25% to 60% v/v, more preferably 35 percent to 55 percent. In terms of weight percent, the ACF is preferably from about 5% to 30% w/w. If the ACF occupy less than about 25% of the volume of composite material, the gaps between carbon granules are not sufficiently (i.e., substantially) filled with ACF. If the ACF occupies more than about 60% of the adsorption volume of the bed, some of the ACF may undesirable compact under normal water flow conditions; thereby adversely impacting the packing density and back pressure characteristics of the filter. In addition, the cost of the composite adsorption bed increases substantially and unnecessarily due to the high cost of the fibers relative to the granules.

The composite adsorption material of the present invention is porous, and upon use as an adsorbent exerts a lower pressure drop.

The composite adsorption material of the present invention can be produced by the following method:
  Preferably ACF and GAC are mixed in water. Wet mixing is carried out by adding prescribed amounts of ACF and GAC to water, and stirring until the mixture becomes uniform. It is possible, although not preferable, to use dispersing liquid media other than water. For example, an aqueous solution of organic solvent, e.g., ethyl alcohol, or inorganic salt can be used. Water used in mixing is usually 300 to 3,000 wt % based on the total weight of the GAC. The mixing is followed by dewatering, with the mixture being allowed to settle rapidly, and the resulting mix is centrifuged to remove excess water. The remaining water in the composite mixture typically varies from 5 to 50 wt % based on the total weight of the composite adsorption mixture. Mixing for a period of about 1 to 15 minutes is generally sufficient, followed by 1 to 10 minutes of centrifugation to remove the excess water from the composite adsorption material.

The composite adsorption material obtained by the above process can be packed into a suitable adsorption column, making an adsorption bed. When said adsorption bed is to be used for its preferred purpose, water filtration, conditions where the adsorbent bed can become fluidized during use are preferably avoided so that lighter ACF particles do not get separated from GAC. In order to avoid adsorption bed fluidization the composite adsorption material preferably should be compacted in the bed. In one embodiment, the adsorption composite material can be compacted between two porous plastic disks, such as those available from Porex Co. (USA), in a cylindrical column. Alternatively, the water should be caused, during filtration, to flow essentially downward through the composite adsorbent material.

The adsorption material of the present invention has good permeability to liquid and to gas and high adsorptivity within a small volume. Pollutants which can be removed by the adsorption material of the present invention mainly include chlorine, harmful organic additives, e.g., phenol, heavy metals, bacteria and suspended solids.

The manner of making composite filters in accordance with the invention and their advantages are further illustrated by the following specific examples. All quantities indicated in the examples, and elsewhere throughout the specification and claims hereof, are by weight, unless otherwise specified.

EXAMPLE 1

Aqualen Y (Rayon type ACF produced by Aquaphor Co., St. Peterburg, Russia; average fiber diameter 6 microns, methylene blue adsorption capacity 450 mg/g), are cut to an average length of 1 cm. One part by weight of the cut fiber is placed in a container, and 100 parts by weight of water added to make a slurry. Seven parts of granular carbon F200 produced by Calgon Carbon Co., USA, average particle size 1 mm, are added to the slurry, followed by stirring well at room temperature. The resulting mixture is centrifuged to reduce the water content to less than 40% w/w.

The dewatered mixture of adsorbents is then tightly packed into a cylindrical filtration chamber 4.5 cm in diameter and 5.7 cm high. The entire available volume of the filtration chamber is filled with the adsorbent mixture. The resulting adsorption bed contains 6 grams of ACF and 43 grams of GAC. Six identical filtration cartridges (carridges A) are prepared. During filtration, the cartridge is standing vertically and liquid is pumped through the cartridge in the upward direction.

COMPARATIVE EXAMPLE A

Twenty five grams of granular activated carbon F200 are packed into a cylindrical filtration chamber 4.5 cm in diameter and 5.7 cm high. Aqualen Y (Rayon type ACF produced by Aquaphor Co., St. Petersburg, Russia; average fiber diameter 6 microns, methylene blue adsorption capacity 450 mg/g) is cut to an average length of 1 cm. Six grams of ACF are packed tightly into the cylindrical filtration chamber on top of the granular activated carbon. The entire available volume of the filtration chamber is filled by the two separate layers of granular activated carbon and activated carbon fiber. Six identical filtration cartridges (cartridges B)

are prepared. During filtration, cartridge B is stood vertically and liquid is pumped through it in the upward directed.

EXAMPLE 2

Tap water is pumped through a cartridge A at a flow rate of 400 ml/min. with a peristaltic pump (Model 0759 Cole-Palmer Co., USA). The pressure differential across the filter cartridge is measured with a pressure gauge. One thousand liters of water are pumped through the cartridge continuously. The experiment is repeated with a cartridge B. The results are shown in a Table I below.

TABLE I

| Cumulative volume of water passed through filter (liters) | CARTRIDGE A Pressure Differential (atm) | CARTRIDGE B Pressure Differential (atm) |
| --- | --- | --- |
| 0 | 0.12 | 0.14 |
| 200 | 0.22 | 0.28 |
| 400 | 0.40 | 0.64 |
| 600 | 0.58 | 1.18 |
| 800 | 0.80 | 1.82 |
| 1000 | 1.04 | 1.76 |

Cartridge A, with a composite mixture of ACF and GAC made in accordance with the invention, shows significantly lower pressure resistance than cartridge B containing layers of GAC and ACF.

EXAMPLE 3

One liter of phenol solution in water with a concentration of 100 mg/l is pumped through a new filter cartridge A at a flow rate of 150 ml/min. Filtrate concentration is measured with a spectrophotometer (Model LOMO, Leningrad Optical Co., St. Petersburg, Russia) as 622 nanometers. The experiment is repeated with a new cartridge B and with the cartridges A and B that have had 1,000 liters of tap water passed through them (Example 2). The same experiment is repeated with a solution of copper in water with a concentration of 100 mg/l. Copper concentration in filtrate is measured with an ionic meter. The results are shown in Table II below.

TABLE II

| | Removal of phenol (%) | Removal of copper (%) |
| --- | --- | --- |
| Cartridge A (new) | 100.0 | 99.0 |
| Cartridge A (after 1000 liters) | 80.5 | 91.0 |
| Cartridge B (new) | 99.6 | 99.5 |
| Cartridge B (after 1000 liters) | 79.4 | 81.2 |

Cartridge A shows marginally better rejection (% removal) than Cartridge B for phenol and, while new Cartridge B shows marginally better removal of copper than new Cartridge A, Cartridge A continues to remove more than 90% of the copper after 100 liters of water have passed therethrough, while Cartridge B, after equivalent use, fails to remove almost twice as much copper.

EXAMPLE 4

One liter of water containing 500 u/l of *E. coli* bacteria is pumped through a new cartridge A with a peristaltic pump at the flow rate of 150 ml/min. Filtrate is collected and the *E.coli* concentration found to be 10 u/l. *E. coli* concentration in water is reduced 98%.

EXAMPLE 5

Aqualen Y (Rayon type ACF produced by Aquaphor Co., St. Petersburg, Russia; average fiber diameter 6 microns, methylene blue adsorption capacity 400 mg/g) is cut to an average length of 1 cm. Four samples, each containing half a gram of ACF are soaked for an hour in a beaker containing 100 ml of 2,000 mg/l methylene blue solution (MB-1 Sigma Chemical Co., USA). All of the methylene blue is adsorbed by the ACF. The experiment is repeated twice with 1,500 mg/l methylene blue solution, and 750 mg/l methylene blue solution. After adsorbing methylene blue, the ACF samples contain, respectively, 400 mg, 300 mg, and 150 mg of methylene blue per gram of ACF (four sets of three ACF samples each). The ACF samples are removed from the beakers.

Two samples each of ACF containing 400 mg, 300 mg, and 150 mg of methylene blue per gram of ACF are used to make mixtures of 0.5 g of ACF with 3.3 g of granular activated carbon, TOG 20×50, average particle size 0.5 mm, methylene blue adsorption capacity 120 mg/g (Calgon Carbon Co., USA). Mixed adsorption bed columns with the three different methylene blue concentrations are prepared in accordance with the teachings of the invention disclosed herein. The mixture is, in each case, tightly packed into a cylindrical column 15 mm in diameter. Each ACF-GAC mixture adsorption bed has a 7 cubic centimeters volume capacity.

A second set of two samples each of ACF containing 400 mg, 300 mg, and 150 mg of methylene blue per gram of ACF is placed into 15 mm diameter columns identical to those used above. Each sample of this set is composed to 0.5 g to the ACF packed in a layer on top of a layer of 3.3 g of GAC, TOG 20×50 that is packed into each of these columns first. The combined volume of each of these two-layered adsorption beds is 10 cubic centimeters.

One half of the columns is kept at room temperature for 24 hours and the other half is kept at room temperature for 72 hours. Then 100 ml of 200 mg/l of methylene blue solution are pumped with a peristaltic pump at 20 ml/min. through each column. Filtrate methylene blue concentration is measured with a measured with a spectrophotometer. The results of the experiments are shown in Table III.

TABLE III

| | Filtrate methylene blue concentration (mg/l) | | | |
| --- | --- | --- | --- | --- |
| Methylene blue adsorbed per g of ACF | ACF-GAC mixed 1 day wait | ACF-GAC mixed 3 day wait | ACF-GAC 2 layers 1 day wait | ACF-GAC 2 layers 3 day wait |
| 150 | 0.13 | 0.07 | 0.33 | 0.30 |
| 300 | 0.33 | 0.16 | 3.0 | 0.46 |
| 400 | 0.23 | 0.16 | 2.0 | 0.41 |

A mixture of ACF and GAC made in accordance with the invention are thereby shown to be able to improve its adsorption abilities when it was not in use for one and three days. The ability of the mixture of GAC and ACF was shown to work better than if the same two adsorbents were placed in two layers one on top of another.

One skilled in the art will recognize that, if desired, various adjuncts such as other fibers and granules can be added to the above described composite mixture. For example, ion-exchange resins in fibrous and/or granular form can be employed. The present invention also contemplates the use of a mixture of fibers and granules in which the fibers and granules are thmselves constituted by ion exchange resins as illustrated by the following example 6..

EXAMPLE 6

SR-10 cation exchange resin (Sybron Chemicals, Inc., USA, average particle size 0.3 mm, $Na^+$ forms) is tightly packed into a cylindrical Column X, having a diameter of 15 mm form a 10 cc ion-exchange bed.

One part of ion exchange fibers (Copan, produced by Khimvolokno., St. Petersburg, Russia) having an average fiber diameter of 20 microns and lengths of 0.5 to 1 mm, is mixed, in the manner disclosed in Example 1 above, with eight parts of SR-10 cation exchange resin (Sybron Chemicals, Inc., USA, average particle size 0.5 mm, $Na^+$ form). The mixture is tightly packed into cylindrical Column Y, 15 mm in diameter to form a 10 cc ion-exchange bed. Then a solution of 4.4 meq/l. of $CaCl_2$ is pumped (using a peristaltic pump at a flow rate of 10 ml/min) through each of columns X and Y. Every 500 ml of filtered solution was collected and calcium concentration was measured. The results are shown in Table IV below.

TABLE IV

Calcium Concentration in Filtered Solution (meq/Liter)
Cumulative Concentration passed through column

TABLE IV

| Calcium Concentration in Filtered Solution (meq/liter) Cumulative Concentration passed through column | | | |
|---|---|---|---|
| (Liters) | 0.5 | 1.0 | 1.5 |
| Column X | none | 0.04 | 0.05 |
| Column Y | none | none | none |

While this invention has been described with reference to particular embodiments, and illustrated by means of specific examples, it will be apparent to those skilled in the art that variations and modification can be made without departing from the principles and scope of the invention as expressed in the appended claims.

What is claimed is:

1. A composite filter for the purification of water, comprising a packed mixture of activated carbon fibers and activated carbon granules, wherein the average diameter of the activated carbon granules is an order of magnitude larger than the average diameter of the activated carbon fibers, and wherein the activated carbon fibers substantially fill any large gaps between the granules while leaving flow paths therethrough.

2. The filter of claim 1, wherein the activated carbon fibers have an average diameter between about 1 and 30 microns.

3. The filter of claim 1, wherein the activated carbon fibers have and average diameter between about 4 microns and 20 microns.

4. The filter of claim 3, wherein the activated carbon granules are from 0.1 mm to 2 mm in diameter.

5. The filter of claim 4, wherein the composite mixture comprises 5% to 30% by weight of activated carbon fibers, and from 70% to 80% by weight of activated carbon granules.

6. The filter of claim 1, wherein the activated carbon fibers have lengths from about 0.2 to 20 mm.

7. The filter of claim 6, wherein the activated carbon fibers have a specific surface area of at least 400 $m^{2/}$ g, and an adsorption capacity for methylene blue of at least 200 mg/g.

8. The filter of claim 7, wherein the granular activated carbon is from 0.1 mm to 2 mm in diameter, wherein it has a specific surface area of at least 300 m2/g, and wherein it has an adsorption capacity for methylene blue of at least 50 mg/g.

9. The filter of claim 1, and further including an ion exchange resin dispersed throughout the packed mixture, said ion exchange resin being in the form of fibers, particles, or a combination of fibers and particles.

10. A composite filter for the purification of water comprising a packed mixture of fibers and granules, wherein the average diameter of the granules is at least 200 microns and an order of magnitude larger than the average diameter of the fibers and the diameter of substantially all of the granules exceeds the diameter of substantially all of the fibers by a factor of at least 2, wherein the granules are selected from the group consisting of activated carbon and ion exchange resin, and the fibers are activated carbon, and wherein the activated carbon fibers substantially fill any large gaps between the granules while leaving flow paths therethrough.

11. The filter of claim 10, wherein the fibers have an average diameter between about 1 and 30 microns and the granules are from up to 2 mm in diameter.

* * * * *